US005454178A

United States Patent [19]

Rivard

[11] Patent Number: 5,454,178

[45] Date of Patent: Oct. 3, 1995

[54] MEDALLION FOR MEMORIALIZING AN INDIVIDUAL

[75] Inventor: Peter A. Rivard, Jaffrey, N.H.

[73] Assignee: D. D. Bean Co., Jaffrey, N.H.

[21] Appl. No.: 189,440

[22] Filed: Jan. 31, 1994

[51] Int. Cl.[6] .......................... G09F 19/00; F16M 13/00

[52] U.S. Cl. .......................... 40/124.5; 40/607; 248/558; 248/535

[58] Field of Search .......................... D99/17, 18, 24; 40/124.5, 607, 606, 605, 618, 620; 248/558, 512, 518, 514, 535, 533; D11/116, 132

[56] References Cited

U.S. PATENT DOCUMENTS

| | | | |
|---|---|---|---|
| D. 71,017 | 9/1926 | Hodgins | D11/116 |
| D. 292,502 | 10/1987 | Croker et al. | D11/116 X |
| D. 316,469 | 4/1991 | Zapata | D99/18 |
| D. 333,029 | 2/1993 | Hartline | D99/17 |
| 1,203,937 | 11/1916 | Surface | 248/514 X |
| 1,782,070 | 11/1930 | Lazarus | 248/512 X |
| 2,023,519 | 12/1935 | Durrett et al. | 40/124.5 X |
| 2,148,660 | 2/1939 | Sweeny | 40/124.5 |
| 2,840,942 | 7/1958 | Ryan | 40/606 X |
| 2,940,606 | 6/1960 | Kurnitz | 40/605 X |
| 3,822,487 | 7/1974 | Koch | 40/620 X |
| 3,949,506 | 4/1976 | Benkowski | D11/132 X |
| 4,227,325 | 10/1980 | Whitford | 40/124.5 |
| 4,262,438 | 4/1981 | Scherer | 40/607 |
| 4,285,149 | 8/1981 | Berryhill | 40/124.5 |
| 4,463,527 | 8/1984 | Schlösser . | |
| 4,631,859 | 12/1986 | Letter et al. . | |
| 4,641,448 | 2/1987 | Cobb et al. | 40/606 |
| 4,658,527 | 4/1987 | Pingel | 40/606 |

*Primary Examiner*—Kenneth J. Dorner
*Assistant Examiner*—Joanne Silbermann
*Attorney, Agent, or Firm*—George W. Dishong

[57] ABSTRACT

A plaque or medallion marker which is serially stackable and rotatably mountable onto a stake, rod or post for insertion into the ground or other base material. A second medallion and subsequently additional medallions may be stackably mounted onto stacking rods. The additional medallions may stackably mount at angles such as 30°, 45°, 60° etc. from the vertical direction as measured from the top of the medallion. The medallion/markers may be used typically at grave sites or may be used to identify any region or site. The material is of such composition and finish so as to withstand weathering and to substantially retain the original aesthetic. More particularly the medallion is circular with defined regions or zones. There is an innermost zone representing the existence within the individual of the most fundamental interests of the individual during his/her lifetime and in which there may be placed appropriate indicia signifying such values and interests. An inner zone which completely borders on the innermost zone but having an inner boundary distinct from the boundary defining the innermost zone. The inner zone is further defined by an outer boundary. There is additionally a medallion boundary separate and distinct from the inner zone outer boundary but substantially contiguous therewith signifying the existence of a relationship between the individual's inner attributes and values and all relationships outside of the "soul" or persona of the individual.

4 Claims, 4 Drawing Sheets

MEDALLION FOR MEMORIALIZING AN INDIVIDUAL

BACKGROUND OF THE INVENTION

Field of the Invention

This invention most generally relates to a plaque or medallion marker which is serially stackable and rotatably mountable onto a stake, rod or post for insertion into the ground or other base material. A second medallion and subsequently additional medallions may be stackably mounted onto stacking rods. The additional medallions may stackably mount at angles such as 30°, 45°, 60° etc. from the vertical direction as measured from the top of the medallion. The medallion/markers may be used typically at grave sites or may be used to identify any region or site which is being used in memorializing an individual. The material is of such composition and finish so as to withstand weathering and to substantially retain the original aesthetic. More particularly the medallion is circular with three (3) defined regions or zones. There is an innermost zone representing the existence within the individual of the most fundamental interests of the individual during his/her lifetime and in which there may be placed appropriate indicia signifying such values and interests. Further, there is an inner zone which completely borders on the innermost zone but having an inner boundary distinct from the boundary defining the innermost zone. The inner zone is further defined by an outer boundary. There is additionally a medallion boundary separate and distinct from the inner zone outer boundary but substantially contiguous therewith signifying the existence of a relationship between the individual's inner attributes and values and all relationships outside of the "soul" or persona of the individual. This zone is identified as the related zone which is infinite in extent.

DESCRIPTION OF THE PRIOR ART

The prior art includes markers which provide for the basic identification of the deceased individual along with general comments or quotations. Some prior art grave site markers provide for various forms of utility such as picture display, grave site care receptacle, viewing of scenes having significance for the deceased, provided flower or plant receptacle etc. However, none of the prior art known to the inventor hereof, provides for the personalizing of the elements of importance and lifelong concerns and captures the essence of the character of the deceased in a manner which is geometrically symbolic and at the same time aesthetically pleasing to those visiting the site.

It would be desirable and advantageous to have a marking or memorializing device, such as a medallion, having the particular objectives, features and advantages of: 1) Serial stackability on a stake and rod arrangement for placement into the ground, or for placement in a horizontal plane into a concrete base or other firm base material, the medallion having features which substantially deter the removal of the medallion from the base; 2) Adaptability to the incorporation of selection of designs and printing; 3) Useful for both inside and outside memorializing; 4) Easy to use and to assemble; and 5) Simple, effective and aesthetically pleasing.

Some inventions related to the instant invention and disclosed in the following United States Patents have been studied. The following is a brief description and discussion of patents defining the most closely related inventions.

U.S. Pat. Nos.: 4,227,325, to Whitford, L., Oct. 14, 1980; 4,658,527, to Pingel, Matthias, Apr. 21, 1987; 4,463,527, to Schlosser, Aug. 7, 1984; 4,631,859, to Letter et al, Dec. 30, 1986; Des. 316,469, to Zapata, A., Apr. 23, 1991; Des. 333,029, to Hartline, D., Feb. 2, 1993; 4,285,149, to Berryhill, A., Aug. 25, 1981; 4,641,448, to Cobb et al, Feb. 10, 1987; 4,262,438, to Scherer, J., Apr. 21, 1981

Essentially all of the patents are of interest in that they are directed to devices for marking and in particular grave marking or memorializing an individual (except for the patents to Scherer '438 and Cobb et al '448 which teach a means for street sign assembly and a post capping scheme). There are utility patents which disclose ways of viewing pictures within an enclosure (Whitford, '325), marker with a removable cover providing access to a storage area (Schlosser, '527), an integral grave marker and flower receptacle (Letter et al, '859), a grave marker provided with an identification holder having two channels one having a spring to keep the identification in place on the marker (Berryhill, '149) and a sign holder with spaced front and rear panel members, at least one of the panel members being adapted to receive indicia thereon for display purposes along with a plurality of vertically spaced, transverse web members connected between the front and rear panels (Pingel, '527). In addition to the five (5) utility patents there are two (2) Design Patents which disclose specific geometries and one of which discloses a specific symbol at each end of the front-facing surface of the marker (Hartline, '029 and Zapata, '469). None of these Patents disclose the invention taught and claimed herein.

SUMMARY OF THE INVENTION

In order to fairly characterize the medallion, the inventor hereof provides the following description of the meaning and the suggestions presented by the shape and the indicia provided on the medallion.

The inner core of a person, their most central soul and religion, commitment to themselves and their God, is represented by the innermost enclosed circle or innermost zone of the medallion i.e., center of self. This innermost zone, or central core is protected and held by the circle of family. Continuous and non-broken, the line of the circle signifies the commitment to family made possible only by the central core of a person's soul. Also, the circle of family is committed to the individual's soul, recognizing the importance and the beauty of simply working together.

The inner zone or inner circle (as compared with the innermost zone) of commitment is the organization by which the person identifies themselves, gives of themselves as made able by the circle of family lending its support. The organization embraces the person as that person would embrace the organization, helping it to keep its strength and shape —i.e., the circle of commitment to a larger organization.

The central core of self, the circle of family and the circle of organizational commitment carry the person throughout the cycle of life. The overall shape of the medallion represents this cycle of life and the closure whence found when the circles grow and touch the lives of others for the betterment of the organization, the family and the self. This related and infinite zone, the region outside of the outermost medallion boundary surface, relates total of, the lifetime of the soul/center or self of the individual, the organizations and family with the remainder of all that influences those material portions of the medallion.

Finally, the material of which the medallion is made represents strength and permanency, symbolic of the commitment a person makes to their organizations which includes the family.

Basically the present invention in its most simple form of embodiment is directed to a plaque or medallion marker which is serially stackable and rotatably mountable onto a stake, rod or post for insertion into the ground or other base material. The medallion may also be conveniently set into a cement base in such a manner so that the indicia on the front-facing region and in the several zones on the front are flush with the surface. The means for serially stacking provides for securely embedding of the medallion into the cement.

It is a primary object of the present invention to provide a memorializing medallion composed of at least one material which is of such composition and finish so as to withstand weathering and to substantially retain original aesthetic. The medallion is for use in memorializing an individual. The medallion comprises: a front-facing region having an outermost boundary surface determining thereby a geometry of the front-facing region; an innermost zone incorporated within and substantially central of the front-facing region. The innermost zone is defined by an innermost boundary surface. There is also an inner zone incorporated within the front-facing region and substantially surrounding the innermost zone. The inner zone is defined by an inner boundary surface contiguous with and different from the innermost boundary surface and there is additionally an outer boundary surface contiguous with and different from the outermost boundary surface. A rear-facing region is contiguous with the front-facing region and incorporating thereon at least one means for rotatably and stackably mounting the medallion onto a stake, rod and stacking member.

It is another primary object of the present invention to provide the memorializing medallion as above further comprising selected indicia inscribed by any known means within each of the innermost zone and the inner zone of the front-facing region.

It is yet another primary object of the present invention to provide the memorializing medallion as above wherein the at least one material is a combination of at least one material selected from the list consisting of silver, gold, copper, lead, nickel, tin, iron and alloys produced therefrom, marble, stone, wood and plastics and wherein the geometry of the front-facing region defined by outermost boundary surface is circular and substantially discoid.

It is still another primary object of the present invention to provide a memorializing medallion as above wherein the innermost boundary surface defines a recessed circular innermost zone and the inner boundary surface and the outer boundary surface, in combination, define a recessed inner zone.

It is a further primary object of the present invention to provide the memorializing medallion as above wherein the at least one means for rotatably and stackably mounting the medallion onto a stake and stacking member is a plurality of raised segments each having a bottomed aperture therein with an opening of the aperture oriented and directed to permit the insertion of each stake and stacking member in a direction substantially parallel to the front-facing region.

A yet further primary object of the present invention is to provide the memorializing medallion as above wherein the at least one means for rotatably and stackably mounting further comprises means for lockingly securing the medallion onto the stake or stacking member.

These and further objects of the present invention will become apparent to those skilled in the art after a study of the present disclosure of the invention and with reference to the accompanying drawings which are a part hereof, wherein like numerals refer to like parts throughout, and in which:

DESCRIPTION OF THE PREFERRED EMBODIMENTS

Figure 1:
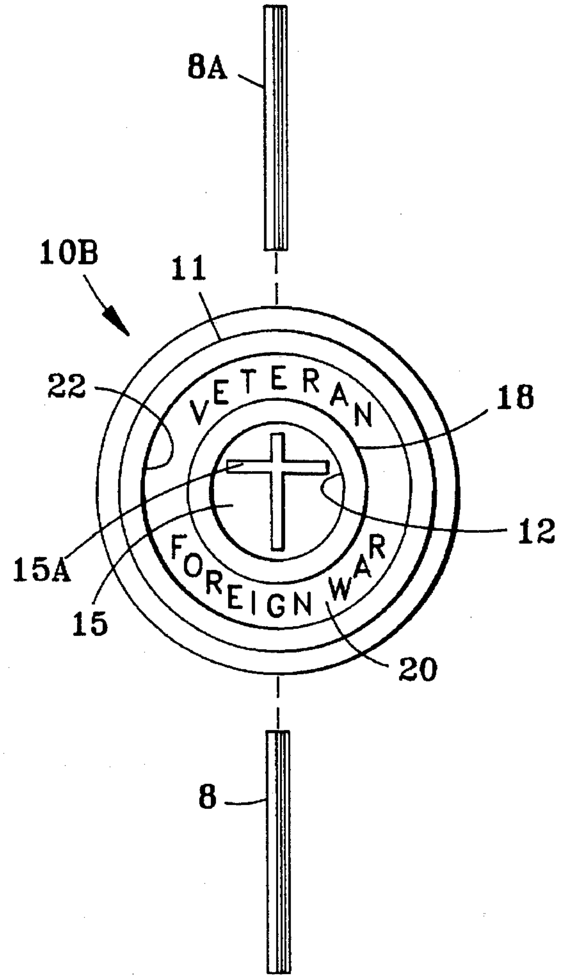
FIG. 1 is a front view or a view of the front-facing region of one embodiment with elevated boundaries of the memorializing medallion.
Figure 2:
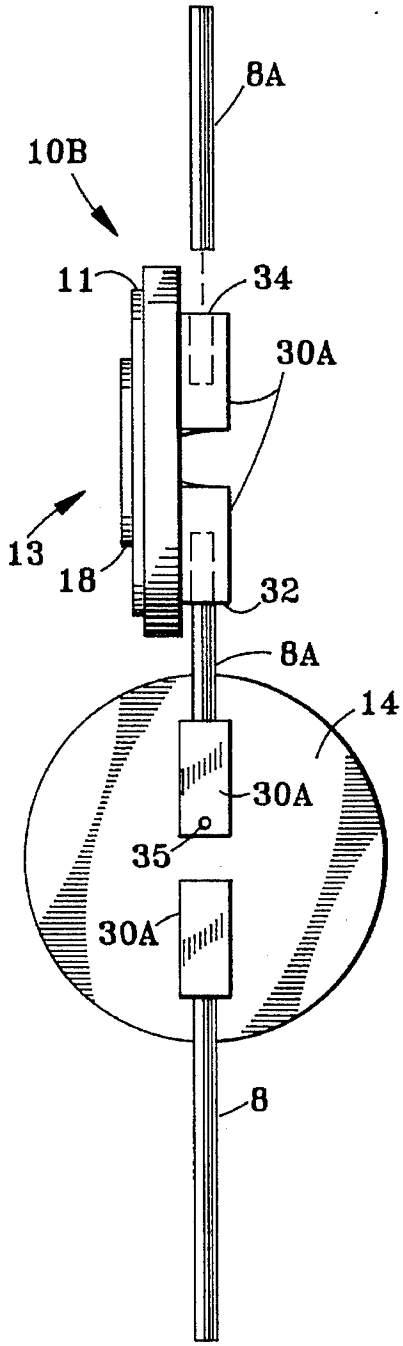
FIG. 2 is a side view of the medallion of FIG. 1 stacked above a second medallion which is shown from the rear-facing region of the medallion.

The construction and the design of the medallion 10, 10A or 10B will be described with reference to FIGS. 1–6 collectively. Note, however, that medallion 10B of FIGS. 1 and 2 has a front-facing region 13 which is different from the front-facing region of medallion 10 and 10A of FIGS. 3–6. Clearly, it is obvious that many forms and varieties of front-facing surface geometry may be used. Similarly, many forms and varieties of indicia 15A and 20A may be used within zones 15 and 20 of medallion 10 or medallion 10A or medallion 10B (see FIGS. 1 and 2 for medallion 10B and the different design for the front-facing region). Examples of such indicia are CROSS, STAR OF DAVID, FIVE-POINT STARS, or other symbols of choice for use in zone 15. Examples of indicia 20A might be VETERAN, POLICE OFFICER, FIREFIGHTER, AMERICAN LEGION, or any number of other names or symbols of choice for the person being memorialized.

Also it is obvious that the size, weight, thickness, material finish, material type, boundary dimensions etc. may vary and still be within the scope of the invention as described and/or claimed herein.

Memorializing medallion 10, 10A or 10B each is substantially comprised of two (2) fundamental features, elements, components or members; a front-facing region 13, and a rear-facing region 14. Front-facing component or region 13 has thereon an innermost zone 15, and an inner zone 20. There is preferably engraved or inscribed within zones 15 and 20 indicia 15A and 20A chosen by the individual or another on behalf of the individual. Zone 15 is defined by innermost boundary surface 12. Zone 20 is defined by inner boundary surface 18 and outer boundary surface 22 of inner zone 20. Boundary surfaces 12 and 18 are contiguous but not congruent. Boundary surface 22 is contiguous with outermost boundary surface 11 of medallion 10, 10A or 10B. All boundaries surfaces are continuous in that they do not have ends. I.e., the preferable geometry of zone 15 is discoid and the preferable geometry of zone 20 is that of a disc having and inside and outside diameter, sometimes called a deleted disc. Other shapes may be used.

Rear-facing component or region 14 is substantially parallel to region 13 and has contained thereon a means for mounting medallion 10, 10A or 10B onto either stake/rod 8 or stacking rod 8A. Such means for mounting may be a plurality of raised segments, collectively opposed pair 30A each having an aperture 32 sized to fit onto stake 8 or an aperture 34 each sized to fit onto stacking rod 8A. It is preferable that apertures 32 and 34 be sized equal and that stake 8 and rod 8A have substantially equal cross-sections. Apertures 32 and 34 are bottomed in that they need not be apertures which continue through segments 30A. It may be advantageous to provide drain hole 35 at the bottom of each of the apertures to permit moisture to exit. There may also be provided a means for clamping, clamp holes 36 and clamping set screws (for example) 36C which effectively clamps and/or locks medallion 10, 10A or 10B onto either stake 8 or rod 8A. Set screw 36C may be keyed to prevent easy removal and locking device 36B inserted through locking holes 36A (which locking holes would be in raised segment 30A and in rods 8 and 8A) thereby clamping and locking medallion 10, 10A or 10B onto rods 8 or 8A preventing easy removal.

Figure 3:
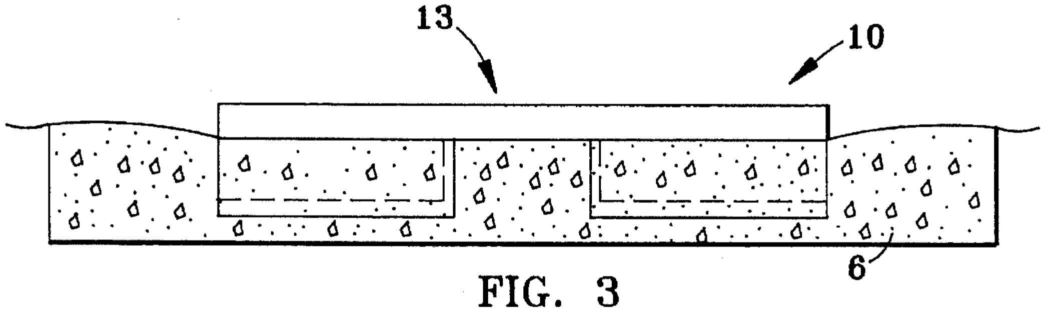
FIG. 3 is a side view of another embodiment of the memorializing medallion embedded into a concrete base and depicting the flow of concrete into the apertures of the raised segments.
Figure 4A:
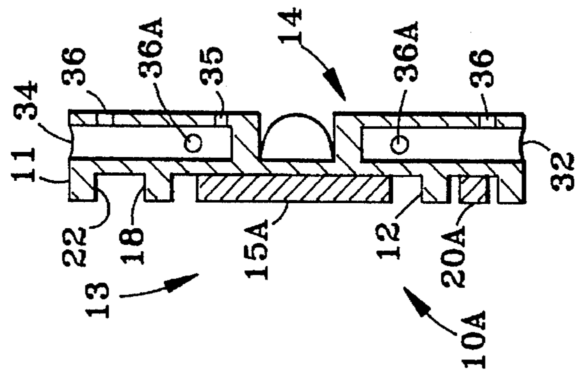
FIG. 4A is a cross section view of the medallion of FIG. 4 detailing drain holes, lock holes and clamping holes.
Figure 4:
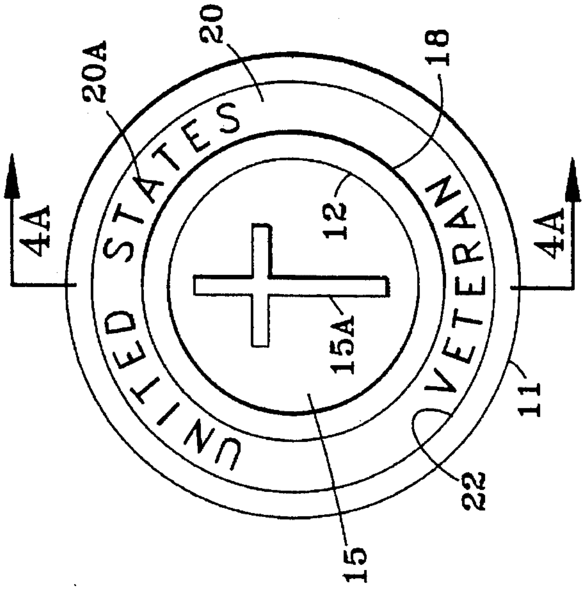
FIG. 4 is a front view or a view of the front-facing region of another embodiment with four (4) pairs of raised segments; memorializing medallion.
Figure 4B:
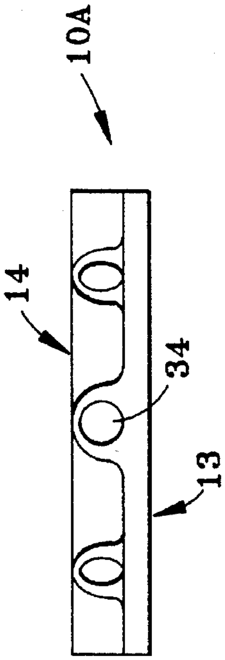
FIG. 4B is a top view of the medallion of FIG. 4.
Figure 4C:
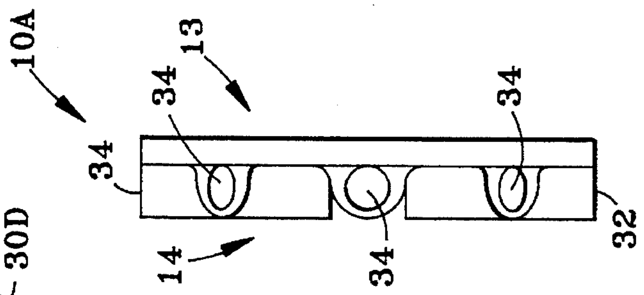
FIG. 4C is a side view of the medallion of FIG. 4.
Figure 4D:
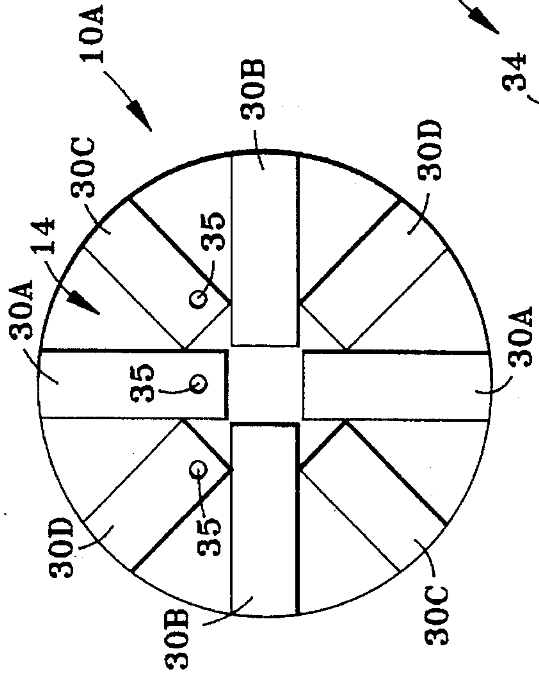
FIG. 4D is a rear view or a view of the rear-facing region of the medallion of FIG. 4 illustrating the pairs of raised segments.

In FIG. 3 medallion 10 or 10A is shown embedded within a foundation or base 6. Medallions 10, 10A or 10B may be mounted or embedded so that front-facing region 13 is viewed from above, front the front or even from below. Raised segment pairs 30A and/or pairs 30B, 30C and 30D and apertures 32 and 34 provide a means for causing medallion 10, 10A or 10B to be securely and substantially irremovably embedded into foundation or base 6.

Figure 5:
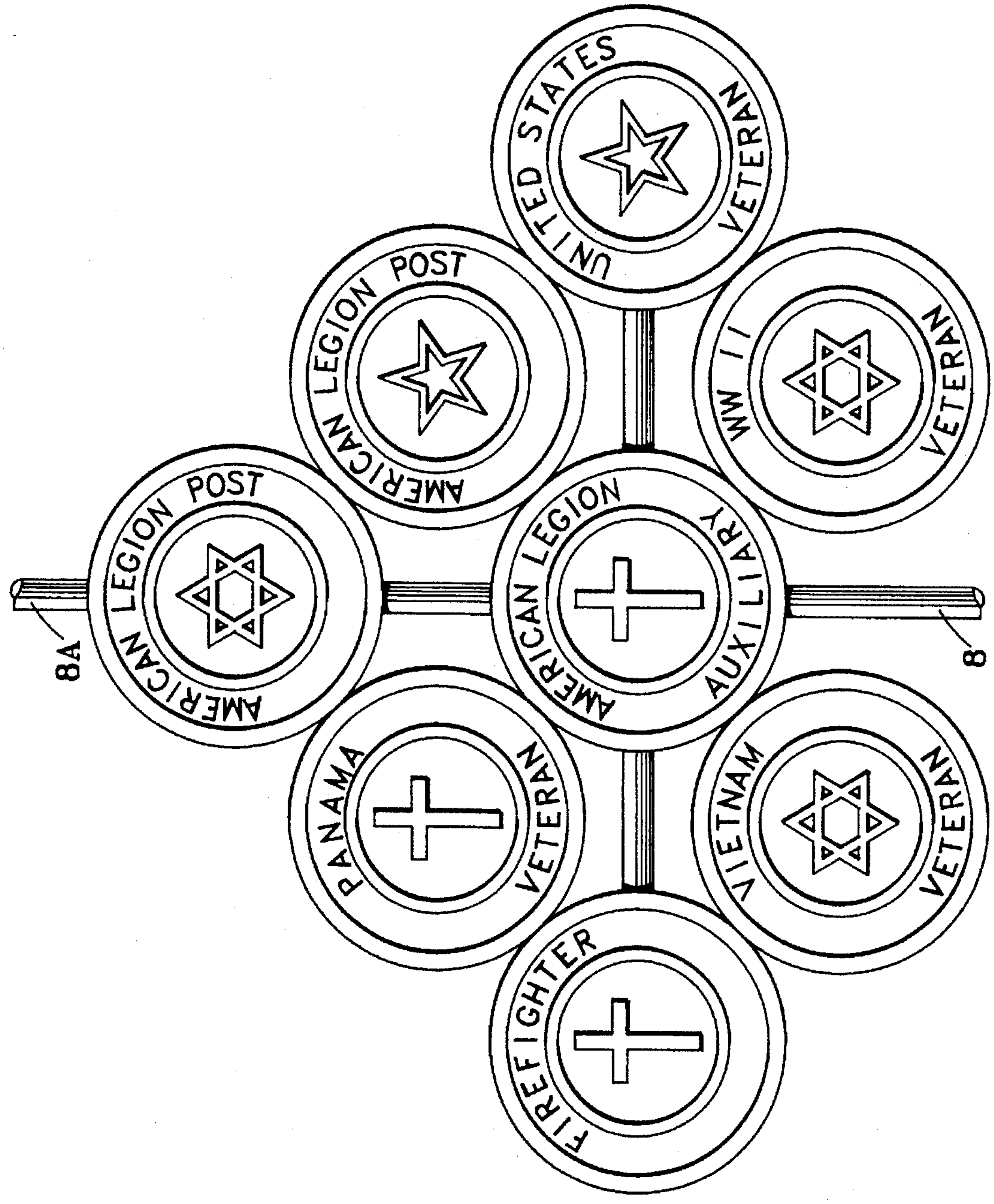
FIG. 5 is a front view of a plurality (8) of the medallions of FIG. 4 assembled or stacked using stacking rods.
Figure 6:
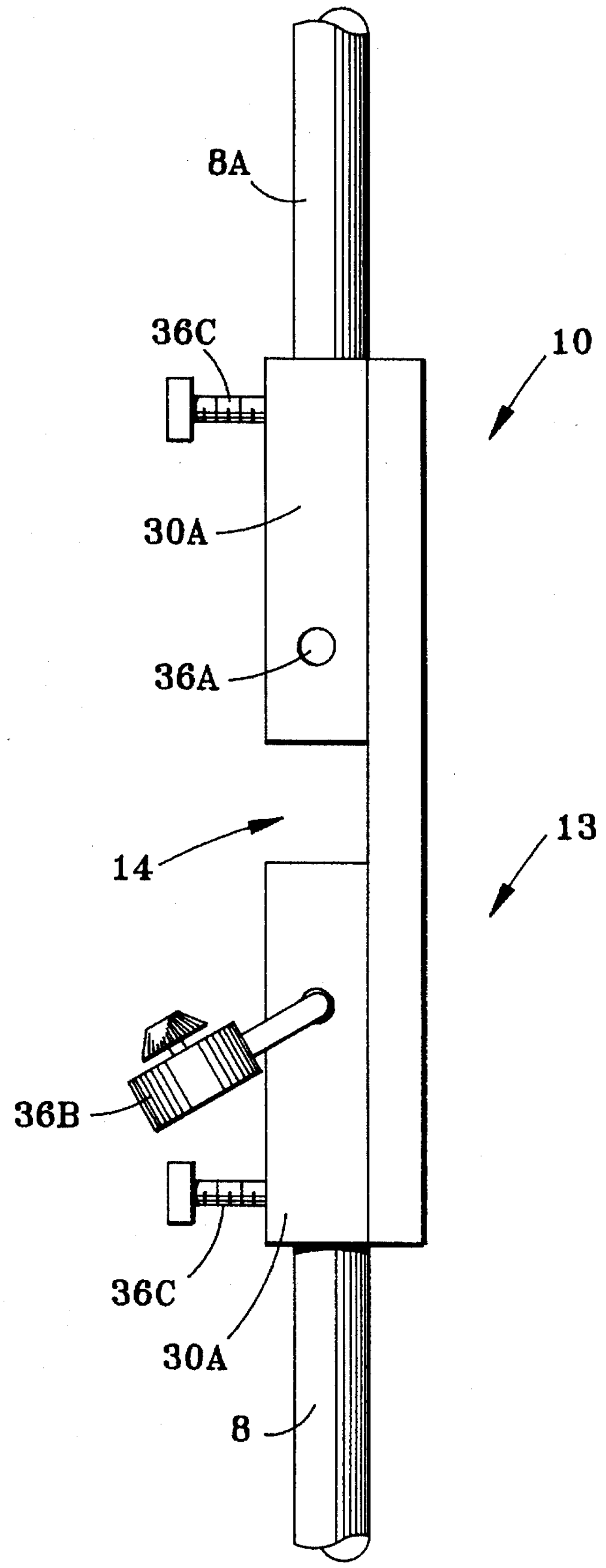
FIG. 6 is a side view of one embodiment of the medallion showing the means for clamping and locking the medallion to rods and stakes.

FIG. 5 provides an indication of the manner in which almost any number of medallions 10 and/or 10A may be combined to form a "tree-like" display. It is clear to any ordinarily skilled person that there are many forms of display that could be created using medallion 10, 10A or 10B, pegs, stakes or rods 8, 8A all in combination with perhaps flags having particular and timely meaning.

It is understood that memorializing medallion 10, 10A or 10B as illustrated and described herein may have different dimensions and variations of the illustrated basic geometry and the zones may have different relative sizes depending upon the manner in which the deceased is characterized.

It is also thought that memorializing medallion 10 and its use, the number used and manner of use based upon the choice of materials, the zone sizes and the indicia placed within the zones and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

I claim:

1. A memorializing medallion composed of at least one material which is of such composition and finish so as to withstand weathering and to substantially retain original aesthetic, said medallion for use in memorializing an individual said medallion comprising:

a front-facing region having an outermost boundary surface determining thereby a geometry of said front-facing region, said geometry of said front-facing region defined by outermost boundary surface is circular and substantially discoid;

an innermost zone incorporated within and substantially central of said front-facing region, said innermost zone defined by an innermost boundary surface;

an inner zone incorporated within said front-facing region and substantially surrounding said innermost zone, said inner zone defined by an inner boundary surface contiguous with and different from said innermost boundary surface and an outer boundary surface contiguous with and different from said outermost boundary surface, said innermost boundary surface defines a recessed circular innermost zone and said inner boundary surface and said outer boundary surface, in combination, define a recessed inner zone, said innermost zone and said inner zone of said front-facing region each having within, selected indicia inscribed by any known means; and a rear-facing region contiguous with said front-facing region and incorporating thereon a plurality of means for rotatably and stackably mounting said medallion onto a stake and a stacking member, said plurality of means for rotatably and stackably mounting said medallion onto said stake and said stacking member is a plurality of raised segments each having a bottomed aperture therein with an opening of said aperture oriented and directed to permit insertion of each said stake and said stacking member in a direction substantially parallel to said front-facing region, said plurality of means for rotatably and stackably mounting said medallion onto said stake and said stacking member has a means for lockingly securing said medallion onto said stake and a means for lockingly securing said medallion onto said stacking member.

2. The memorializing medallion of claim 1 wherein said at least one material is a combination of at least one material selected from the list consisting of silver, gold, copper, lead, nickel, tin, iron and alloys produced therefrom, marble, stone, wood and plastics.

3. The memorializing medallion of claim 1 further comprising said plurality of means for rotatably and stackably mounting said medallion onto said stake and said stacking member has an aperture for drainage.

4. The memorializing medallion of claim 1 further comprising each said plurality of means for rotatably and stackably mounting said medallion onto said stake and said stacking member has a set screw aperture to prevent rotational movement of said stake and said member.

* * * * *